United States Patent [19]

Usami et al.

[11] Patent Number: 5,894,469

[45] Date of Patent: Apr. 13, 1999

[54] DISK FILE APPARATUS FOR AUTOMATICALLY TAKING OUT AND INSERTING DISK CARTRIDGES

[75] Inventors: Kazuhiro Usami; Shigeo Kawamura, both of Tokyo, Japan

[73] Assignee: NKK Corporation, Tokyo, Japan

[21] Appl. No.: 08/448,363

[22] PCT Filed: Oct. 6, 1994

[86] PCT No.: PCT/JP94/01673

§ 371 Date: May 26, 1995

§ 102(e) Date: May 26, 1995

[30] Foreign Application Priority Data

Oct. 8, 1993 [JP] Japan ................... 5-253092

[51] Int. Cl.⁶ ........................ G11B 17/04; G11B 17/14
[52] U.S. Cl. ..................... 369/192; 369/36; 369/195
[58] Field of Search .................... 369/34, 36, 38, 369/39, 178, 179, 191, 192, 194, 195, 197, 199, 200, 201, 202; 360/91, 92, 98.04, 98.06, 99.06, 99.07

[56] References Cited

U.S. PATENT DOCUMENTS

| | | | |
|---|---|---|---|
| 4,757,401 | 7/1988 | Teranishi | 369/194 |
| 4,998,232 | 3/1991 | Methlie et al. | 369/36 |
| 5,036,503 | 7/1991 | Tomita | 369/34 |
| 5,043,962 | 8/1991 | Wanger et al. | 369/195 |
| 5,123,000 | 6/1992 | Fitzgerald et al. | 369/191 |
| 5,146,375 | 9/1992 | Satoh et al. | 369/178 |
| 5,220,548 | 6/1993 | Nakatsukasa et al. | 369/36 |
| 5,450,391 | 9/1995 | Pollard | 369/191 |

FOREIGN PATENT DOCUMENTS

| | | |
|---|---|---|
| 60-261066 | 12/1985 | Japan . |
| 61-39971 | 2/1986 | Japan . |
| 62-219364 | 9/1987 | Japan . |
| 2-23565 | 2/1990 | Japan . |
| 5-234350 | 9/1993 | Japan . |

*Primary Examiner*—David L. Ometz
*Attorney, Agent, or Firm*—Michael N. Meller

[57] ABSTRACT

A disk file apparatus having a storage device (4) for multi-stageously storing disk cartridges (3) each containing a disk therein while keeping each of said disk cartridges horizontal, a drive device (5), and an automatic disk exchanging device (7) including a carrier device (6) for taking out a disk cartridge in between said storage device and said drive device, carrying the disk cartridge vertically and supplying the disk cartridge, wherein: slide mechanisms (60) are provided on a carrier frame (17) so that the opening/closing of claw arms (24) of a holder (21) provided in the carrier device is interlocked with the going-in-and-out operation of the holder mechanically; the carrier frame is supported so as to be rotatable in the form of a cantilever on the horizontal center of a cartridge storage portion inside thereof; and an inverting device (33) having a solenoid (50) and clutch gears (46, 47) is provided in a holder carrying device (32).

4 Claims, 15 Drawing Sheets

DISK FILE APPARATUS FOR AUTOMATICALLY TAKING OUT AND INSERTING DISK CARTRIDGES

FIELD OF THE INVENTION

The present invention relates to a disk file apparatus in which a large number of disk cartridges each containing an information recording medium such as an optical disk (hereinafter referred to as "disk") are stored automatically so that any one of the disk cartridges can be selectively picked out so as to be supplied to a drive device.

BACKGROUND OF THE INVENTION

For example, as disclosed in Japanese Patent Unexamined Publication No. Sho-60-261066, a conventional disk file apparatus comprises as its basic configuration: a storage device in which disk cartridges each containing a disk are stored multistageously so that each of the disk cartridges is kept horizontal; a drive device for writing/reading information into/from a disk; and a automatic disk exchanging device for picking any one of the disk cartridges out of the storage device selectively, carrying the selected disk cartridge vertically, inserting the selected disk cartridge into the drive device and taking out the disk cartridge from the drive device after writing/reading of information to restore the disk cartridge to its original position of the storage device or restore the disk cartridge to a predetermined position where the disk cartridge can be exchanged for a new one.

Further, the automatic disk exchanging device disclosed in the aforementioned Publication includes: a carrier carrying device for vertically carrying a carrier having claws engaged with a pair of notch grooves provided on opposite sides of the rear portion of each disk cartridge so that the carrier is moved between the storage device and the drive device; a claw carrying device for moving the claws horizontally so that the disk cartridge goes in and out between the storage device and the drive device; and a carrier inverting device for inverting the carrier by 180° so that information can be recorded on opposite surfaces of each disk.

In the conventional automatic disk exchanging device, configured as described above, in a state in which one of the disk cartridges stored in the storage device is drawn out horizontally from a freely selected position of the storage device and stored in a storage portion within the carrier by the claw carrying device through engagement between the claws of the carrier and the notch grooves of the disk cartridge, the disk cartridge is carried to the drive device by the carrier carrying device and then pushed out by the claws so as to be inserted into the drive device whereafter information writing/reading is performed. Thereafter, the disk cartridge is drawn out by the claws from the drive device, stored in the storage portion, carried to the storage device by the carrier carrying device again and then restored to its original position of the storage device.

The conventional automatic disk exchanging device, however, requires a claw carrying device such as a timing belt drive mechanism or requires a claw opening/closing mechanism such as a motor, a solenoid, or the like, separately in the case where the claws are to be opened/closed. Accordingly, not only the whole thickness and weight of the carrier are increased but also the structure thereof becomes complex. There arise a large number of problems which unclude the lowering of reliability, increasing of cost, etc.

Further, in the conventional carrier inverting device, the cartridge storage portion is provide so as not to be concentrical with the rotating shaft of the carrier, so that the height position of the cartridge storage portion varies when the carrier is inverted by 180°. That is, because the cartridge storage portion is located in a position where the cartridge storage portion is eccentric with respect to the carrier rotating shaft, the carrier inverted by 180° is not restored to its original position, so that a difference in height position is formed by the distance of eccentricity. Accordingly, when the disk cartridge is to be inserted into the storage device or into the drive device, the height of the carrier carrying device needs to be adjusted by the difference in height position. There arises a problem that superfluous time is required.

Further, if the stopper mechanism provided in the drive device in order to prevent the disk cartridge inserted therein from springing out is released by using a motor, a solenoid, or the like, in a conventional manner, increases both in space and in cost are brought correspondingly.

Further, though a filter device for preventing dust is generally mounted on the casing of the body of the disk file apparatus, the filter device is hardly used commonly because the filter device is conventionally mounted individually in accordance with the filter type. There arises a problem that an increase in cost is brought.

SUMMARY OF THE INVENTION

An object of the present invention is mainly to solve the problems in the aforementioned conventional automatic disk exchanging devices and carrier inverting devices, that is, to provide a disk file apparatus intended for high reliability, low cost, small size, light weight, and so on.

Another object of the present invention is to operate a stopper mechanism by using a carrier carrying device without use of any driving mechanism such as a motor, a solenoid, or the like, in the case where a disk cartridge is supplied to a drive device.

A further object of the present invention is to make it possible to mount two kinds of filters on one filter holder attached to a casing of a body of a disk file apparatus.

According to the present invention, provided is a storage device in which disk cartridges each containing a disk therein are stored multistageously so that each of the disk cartridges is kept horizontal, a drive device for recording information onto a disk and reproducing information recorded on a disk, and an automatic disk exchanging device for picking a selected one of the disk cartridges out of the storage device so as to carry the selected disk cartridge vertically to supply thereby the selected disk cartridge to the drive device and for picking a disk cartridge out of the drive device so as to carry the disk cartridge vertically to thereby store the disk cartridge in the storage device, characterized in that the automatic disk exchanging device includes: a carrier device connected to a vertically carrying means; a holder allowed to go in and out of the inside of the carrier device and having a pair of claw arms for holding the disk cartridge; and a claw opening/closing mechanism provided in the carrier device, for opening/closing the pair of claw arms by mechanical engagement and interlocking with the going-in-and-out operation of the holder.

Further, in addition of the aforementioned configuration, the present invention is characterized in that there is further provided a carrier inverting device for rotating the carrier device by 180° around a horizontal center axis which passes through the thickwise center of a disk cartridge storage portion inside the carrier device.

Here, the claw opening/closing mechanism by mechanical engagement and interlocking with the going-in-and-out operation of the holder, for example, means a mechanical mechanism in which projections provided on the claw arms are engaged with cam grooves provided in the carrier frame of the carrier device so that the opening/closing of the claw arms are interlocked with the going-in-and-out operation of the holder.

Because the claw opening/closing mechanism according to the present invention is configured in such a manner as described above, the claws can be opened/closed simply by the going-in-and-out operation of the holder without necessity of any motive power device exclusively used for the purpose of opening/closing the claws. Because such a mechanically claw opening/closing mechanism is provided simply on the carrier frame, the carrier device is provided as a small-size, light-weight, compact and low-cost device. Further, because the claw opening/closing mechanism is mechanically interlocked with the going-in-and-out operation of the holder, the operation of the claw opening/closing mechanism becomes secure and high in reliability. Further, controlling performance such as positioning, or the like, is improved by reduction in size and weight of the carrier device. Because upper and lower spaces in the casing of this disk file apparatus can be reduced, the number of disk cartridges to be stored can be increased correspondingly.

The present invention is characterized in that the carrier device has a carrier frame supported on an elevator of the vertically carrying means through a horizontal supporting shaft so as to be rotatable in the form of a cantilever, and that the holder and the claw opening/closing mechanism are mounted on the carrier frame. Accordingly, the carrier frame can be rotated by 180° around the horizontal supporting shaft by the carrier inverting device as occasion demands, so that information can be recorded on the opposite surfaces of a disk. Further, because the height position of the disk cartridge storage portion does not change even in the case where the carrier frame is rotated by 180°, position control is made easy.

The present invention is characterized in that the holder has a holder base which can make a reciprocating motion, and the pair of claw arms provided with claws engaged with notch grooves provided in opposite sides of the disk cartridge. By this configuration, the pair of arms are mechanically interlocked with the aforementioned claw opening/closing mechanism to thereby make it possible to hold and release the disk cartridge.

Further, the present invention is characterized in that a carrier inverting device for rotating the carrier frame by 180° and a carrying device for reciprocating the holder in the inside of the carrier frame are provided on the elevator, and that the carrier inverting device is connected to the carrying device through a clutch mechanism. When the carrier inverting device performs switching-on-and-off of the clutch mechanism, the carrier frame can be inverted by 180° directly by the rotating force of the carrying device.

Further, the present invention is characterized in that the claw opening/closing mechanism is constituted by a slide mechanism provided on the carrier frame, the slide mechanism including: a slide plate having a slide projection abutting on the disk cartridge at an end surface thereof in the direction of drawing-out of the disk cartridge, and a restoration projection abutting on a projection provided on the holder; and a cam plate which is pressed by sliding of the slide plate to thereby make a guide cam project into the carrier frame so as engage with claw opening projections provided on the claw arms. Further, a pair of the claw opening/closing mechanisms are arranged on upper and lower surfaces of the carrier frame on its diagonal. Further, the present invention is characterized in that the apparatus further comprises: a supporting shaft for supporting the carrier frame in the form of a cantilever on the elevator so that the disk cartridge storage portion in the inside of the carrier frame is rotated around a horizontal center axis; a first gear provided on the supporting shaft so as to be rotatable; a second gear provided on the supporting shaft and fixed to the carrier frame; a carrying device formed so that the holder is allowed to go in and out through a gear mechanism engaged with the first gear; and an inverting device formed so that the carrier frame is rotated by 180° through clutch gears which are engaged with the first and second gears, respectively, and provided with a clutch interposed between the clutch gears. Further, the switching-on-and-off of the clutch is performed by a solenoid.

In the slide mechanisms configured in such a manner as described above, when the holder holding a disk cartridge is pulled into the carrier frame, the holder presses the slide projection at an end surface of the disk cartridge to thereby make the slide plate slide. As a result, the cam plate is pressed, so that the guide cam projects into the carrier frame. That is, the projection of the guide cam is equivalent to a stage of preparation for opening the claw arms in order to release the disk cartridge.

When the holder at a predetermined carrying portion is then moved forward, the projections provided on the claw arms so as to be engaged with the guide cam are guided by the guide cam to open the claw arms to thereby release the disk cartridge from the holder. Further, the slide plate is restored to its original position because the projections of the holder abut on the restoration projections of the slide plate. Incidentally, the claw arms are always urged by springs to move in the direction of the closing thereof so that the claw arms are automatically engaged with the notch grooves provided in the opposite surfaces of the disk cartridge.

The going-in-and-out operation of the holder is performed by the carrying device provided on the elevator. Further, the inverting device provided with clutch gears operated by a solenoid is provided in the carrying device. The carrier frame is supported by the horizontal supporting shaft so as to be rotatable in the form of a cantilever. The center of the supporting shaft coincides with the thickwise horizontal center of the disk cartridge storage portion in the inside of the carrier frame. Accordingly, the height position of the disk cartridge storage portion does not change even in the case where the carrier frame is inverted by 180°. Incidentally, the first gear is provided on the supporting shaft so as to be rotatable, so that the rotating motion thereof is converted into a straight advancing motion through the gear mechanism engaged with the first gear to thereby make the holder go in and out. Further, the second gear is provided on the supporting shaft and fixed to the carrier frame and clutch gears are provided so as to be engaged with the first and second gears, respectively. When the carrier frame is to be inverted, the carrier frame is once made free and then the clutch is switched on so that the second gear is driven to rotate by the carrying device to thereby invert the carrier frame by 180°.

Further, the disk file device according to the present invention is characterized in that a stopper device provided in a disk cartridge insertion hole of the drive device includes: a stopper pressed down by the claw arms of the holder; and a guide portion constituted by an inclined surface which is provided in the stopper so that a disk cartridge held by the holder is guided while the stopper is pressed down when the disk cartridge is inserted.

The stopper device is disposed in the disk cartridge insertion hole of the drive device so that there is avoided such a case in which the disk cartridge suffers interference with the carrier frame, holder, etc. on the way of carrying in case where the disk cartridge would be ejected from the drive device. In the present invention, the disk cartridge is guided along the inclined surface of the guide portion so as to be inserted while the stoppers of the stopper device are pressed down by the held disk cartridge at the time of the insertion of the disk cartridge, whereas the stoppers are pressed down by the claw arms projecting from the carrier frame so as to be released to thereby eject the disk cartridge at the time of the ejection of the disk cartridge. By the aforementioned configuration, such a motive power device as exclusively used for the purpose of releasing the stopper device becomes useless. Not only a space can be saved correspondingly but also the stopper device can be produced at a low cost.

Further, in addition of the aforementioned configuration, the disk file apparatus according to the present invention is characterized in that a filter holder for a filter device mounted to a casing of a body of the apparatus includes two kinds of claws different in height so that two kinds of filters different in thickness are fixed thereto.

Because the filter holder of the filter device has two kinds of filter fixing claws different in height, two kinds of filters can be mounted simultaneously or individually by one filter holder. Accordingly, the filter device can be used so as to be common to a plurality of filters irrespective of the kinds of the filters, so that the filter device can be produced at a low cost.

BEST MODE FOR CARRYING OUT THE INVENTION

An embodiment of the present invention will be described below with reference to the drawings.

Figure 1:
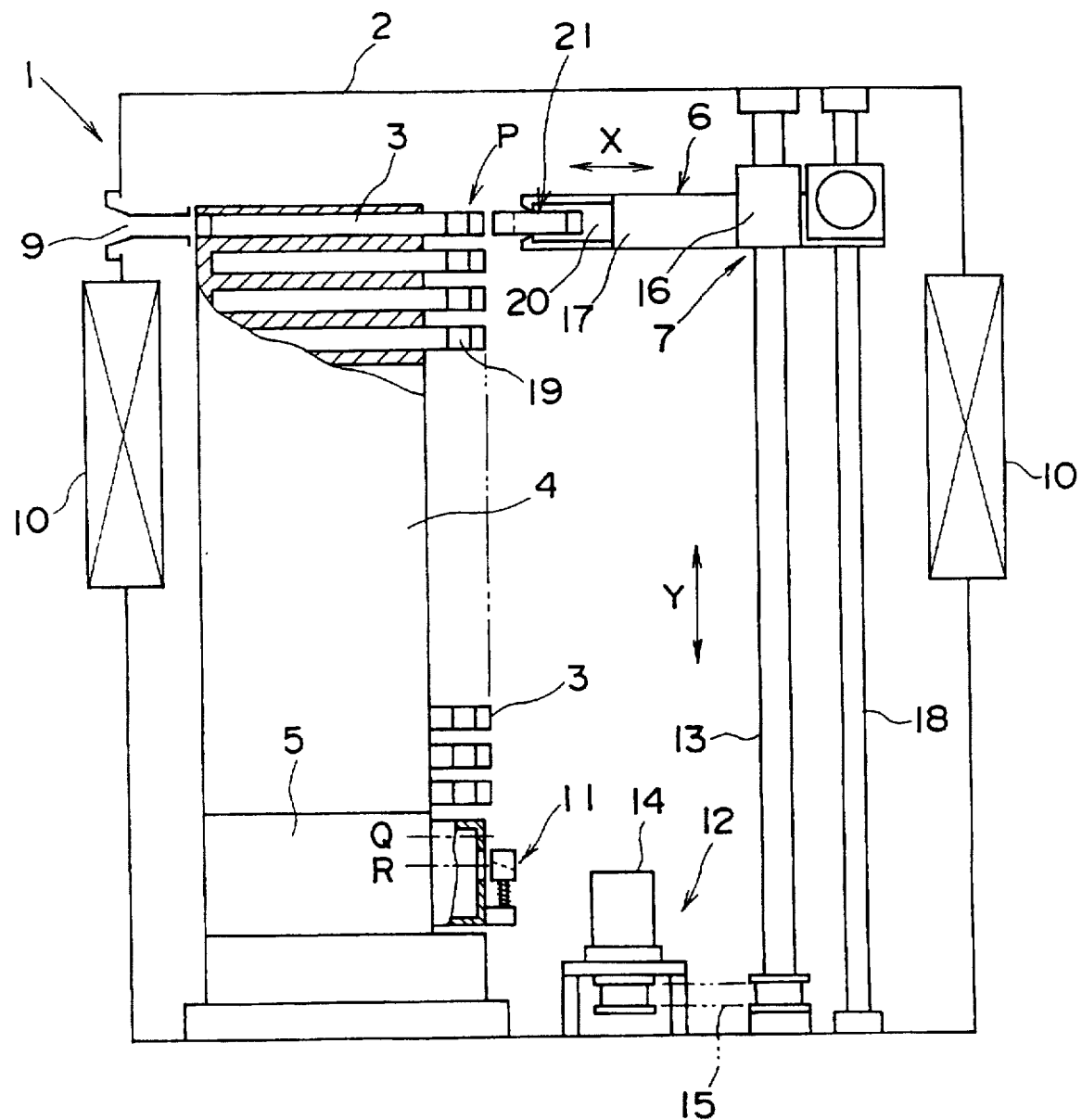
FIG. 1 is a view showing the outline of a disk file apparatus according to an embodiment of the present invention.

The disk file apparatus according to the present invention as generally designated by the reference numeral 1 in FIG. 1 comprises, within a casing 2, a storage device 4 which stores a large number of disk cartridges 3 so that the large number of disk cartridges 3 in a horizontal state are arranged longitudinally, a drive device 5 disposed in the lower portion of the storage device 4 and for writing information into disks within the disk cartridges 3 or reading information from the disks, and an automatic disk exchanging device 7 which moves longitudinally (in the direction of the Y axis) between the storage device 4 and the drive device 5 so that drawing-out, insertion and 180° -inversion of one of the disk cartridges 3 are performed by a carrier device 6, the storage device 4, the drive device 5 and the automatic disk exchanging device 7. Further, in FIG. 1, the reference numeral 9 designates an entrance and exit for the disk cartridges 3. The entrance and exit 9 is designed so that a disk cartridge 3 inserted therein from the outside is fed to a predetermined position P in the upper portion of the storage device 4 and held in the predetermined position P by a feed device not shown. Though not shown in FIG. 1, a mechanism for opening/closing claws of a holder provided in the carrier device 6, a mechanism for transporting the holder horizontally (in the direction of the X axis) and a mechanism for inverting the carrier device 6 by 180° will be described later.

The reference numeral 10 designates a filter device provided in a predetermined position of the casing 2 and a stopper device 11 provided in an insertion hole portion of the drive device 5. These devices 10 and 11 will be described later. Further, the reference numeral 12 designates a carrier carrying device of the automatic disk exchanging device 7 which constitutes means for carrying the carrier device 6 longitudinally. The carrier carrying device 12 is designed so that a carrier frame 17 of the carrier device 6 is moved up and down through a nut member 16 thread-engaged with a multi-thread screw 13 when the multi-thread screw 13 is driven to rotate by a motor 14 through a toothed belt mechanism 15. The reference numeral 18 designates a guidepost for the carrier frame 17.

Figure 2:
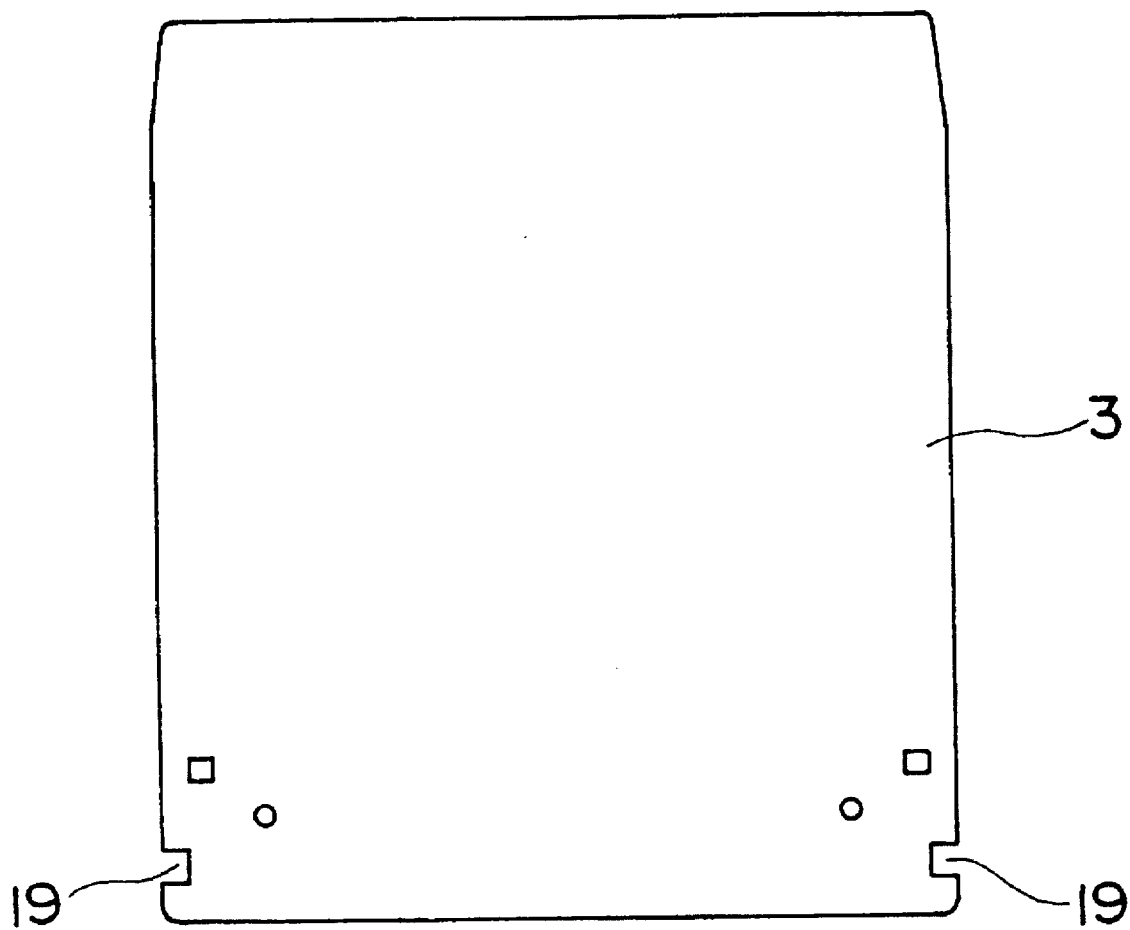
FIG. 2 is a plan view of a disk cartridge.

FIG. 2 is a plan view of a disk cartridge 3 used in the apparatus according to the present invention and provided with a disk not shown but stored in the disk cartridge 3. A pair of notch grooves 19 are provided in opposite sides, respectively, of the rear portion of the disk cartridge 3 so that the disk cartridge 3 is drawn out of the storage device 4 or the like by making the claws of the holder (which will be described later) engage with the pair of notch grooves 19.

Figure 3:
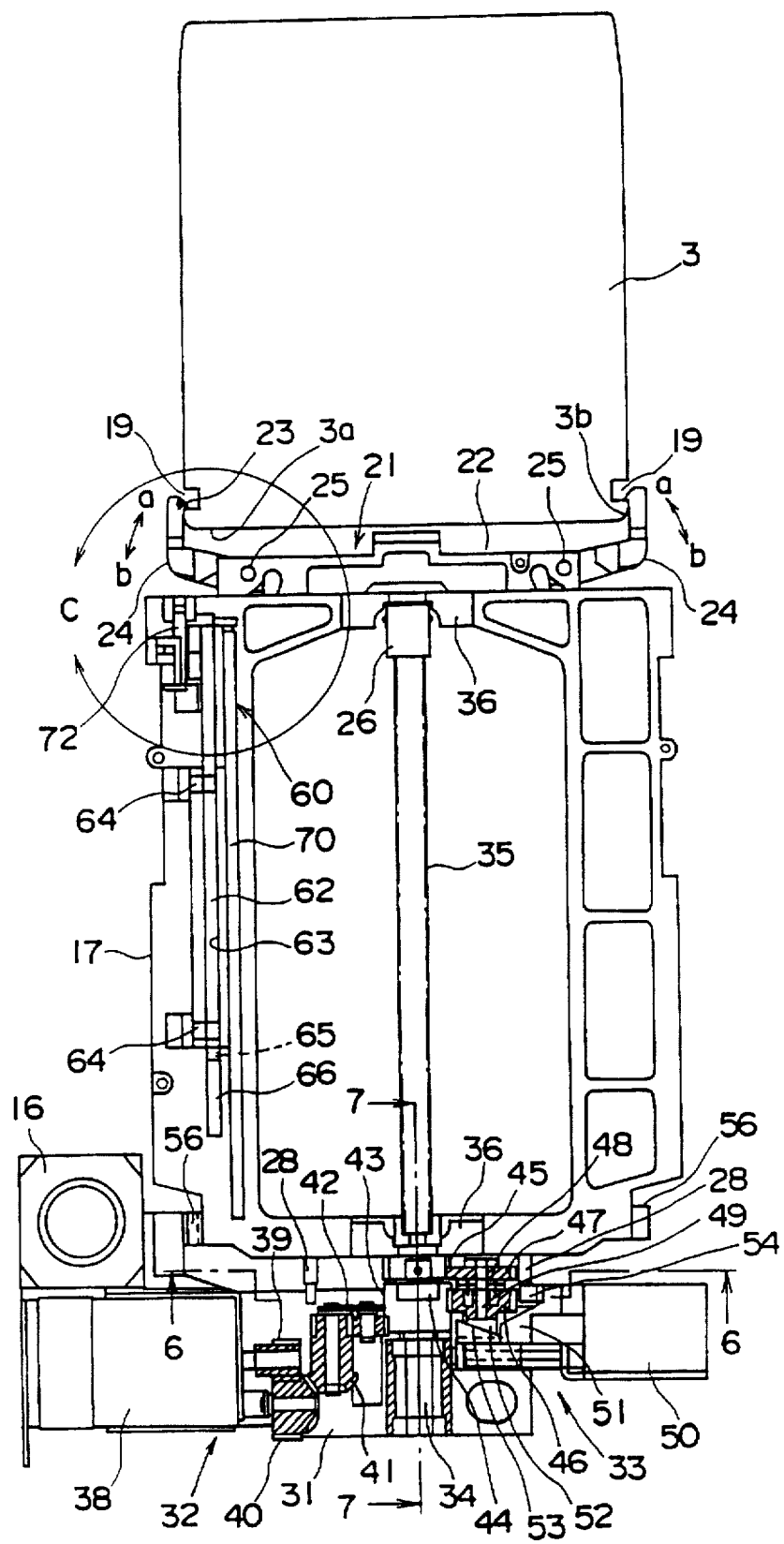
FIG. 3 is a plan view showing a state in which a disk cartridge is held.
Figure 4:
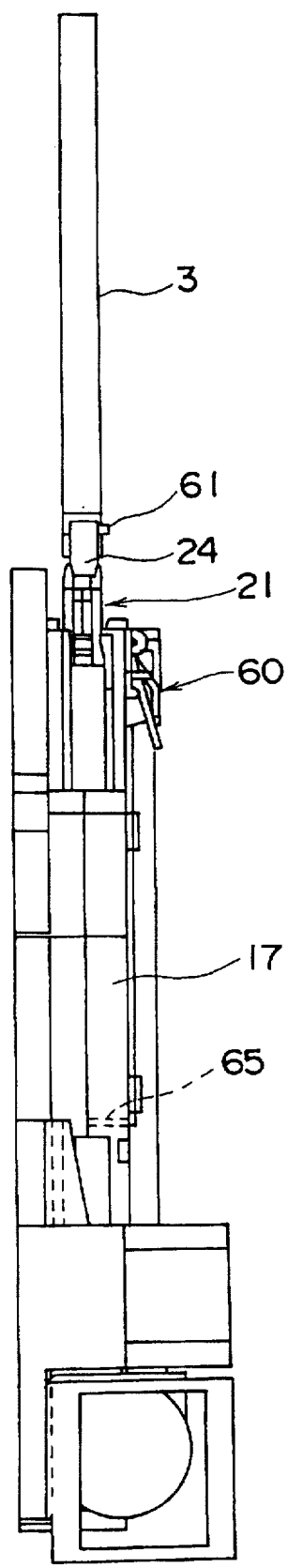
FIG. 4 is a side view of FIG. 3.
Figure 5:
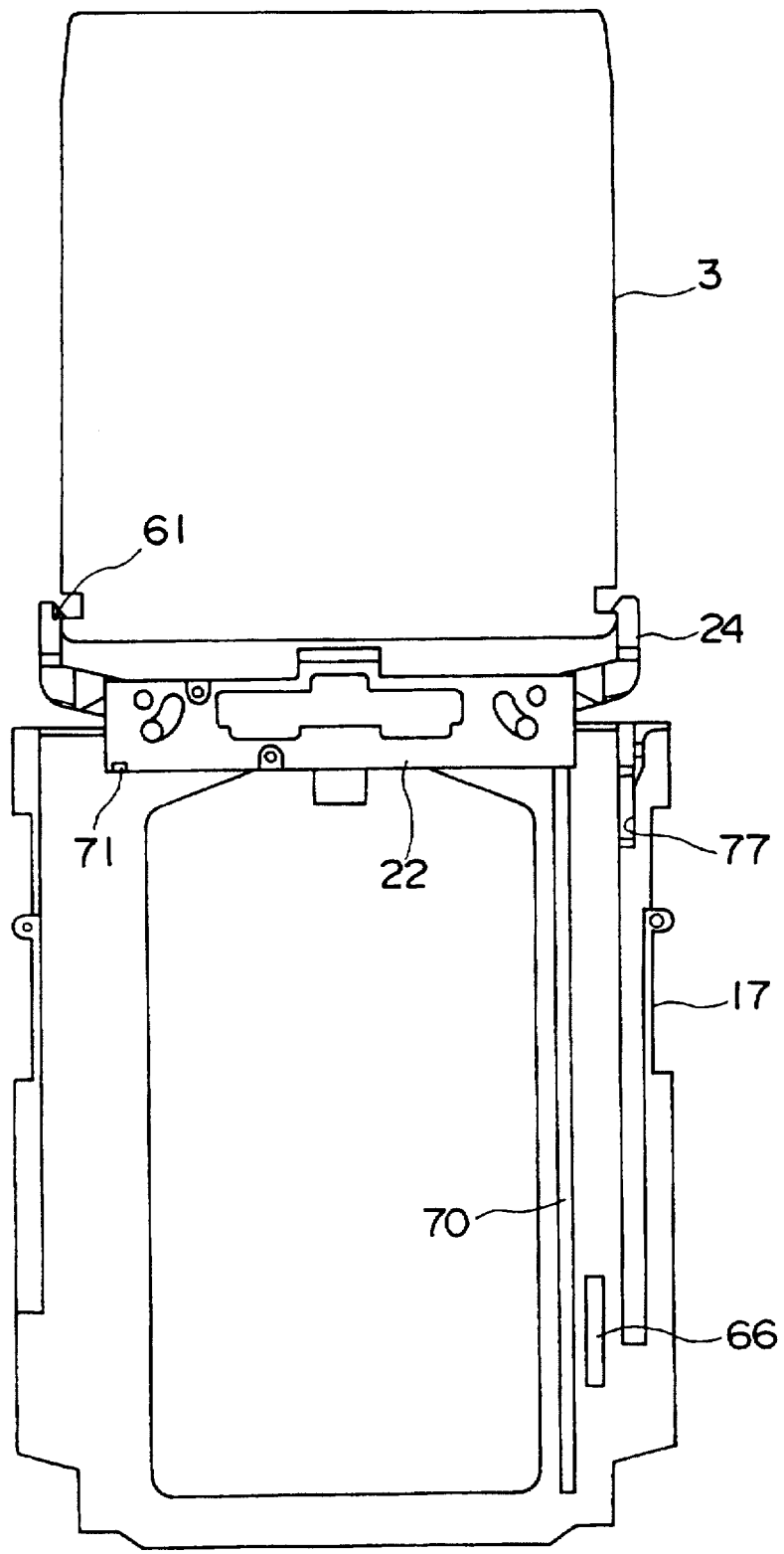
FIG. 5 is a rear view from the inside of a carrier frame.

FIG. 3 is a plan view of the carrier device 6 constituting a main portion of the automatic disk exchanging device 7, additionally showing a state in which a disk cartridge 3 is held by the holder 21. FIG. 4 is a side view of FIG. 3. FIG. 5 is a rear view from the inside of the carrier frame.

The holder 21 is designed so as to go in and out of the inside of the carrier frame 17 of the carrier device 6 and is configured so that arm-like claws 23 engageable with the notch grooves 19 of the disk cartridge 3 are pivoted on opposite sides of a holder base 22 so as to be openable and closable. A pair of claw arms 24 rotate around respective pivots 25 in the directions of the arrows a and b. Further, the claw arms 24 are normally urged so as to be closed (in the directions of the arrows a) by means of torsion springs not shown.

Figure 6:
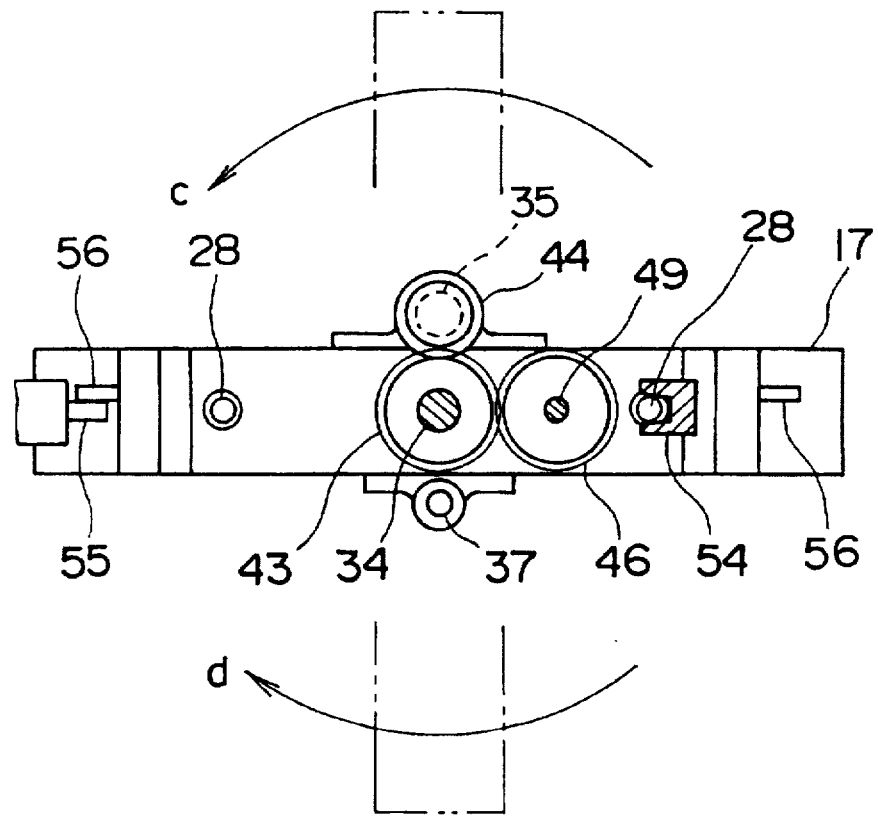
FIG. 6 is a sectional view taken along the line 6—6 in FIG.3.
Figure 7:
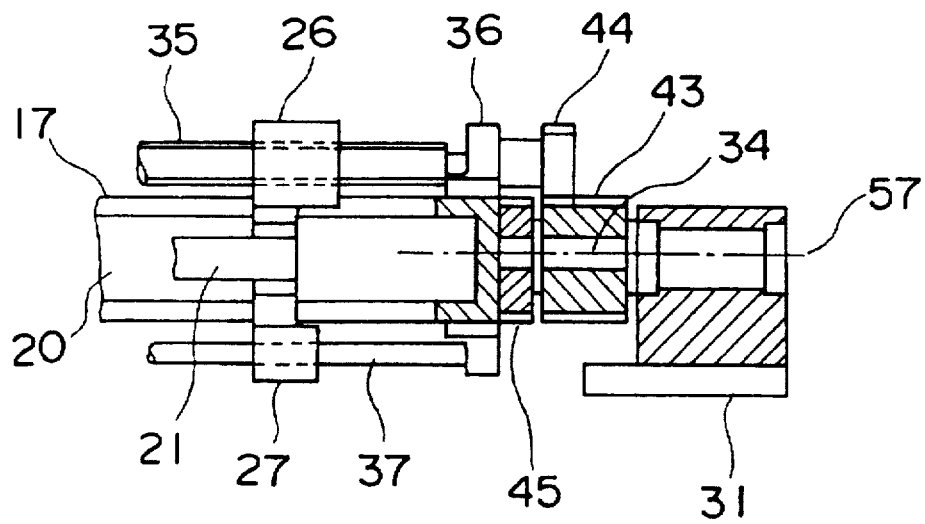
FIG. 7 is a sectional view taken along the line 7—7 in FIG. 3.

Further, FIG. 6 is a sectional view taken along the line 6—6 in FIG. 3, and FIG. 7 is a sectional view taken along the line 7—7 in FIG. 3.

The rear portion of the carrier frame 17 is supported on an elevator 31 so as to be rotatable in the form of a cantilever.

A carrying device 32 for carrying the holder 21 and a carrier inverting device 33 are arranged on the elevator 31.

The inside of the carrier frame 17 forms a disk cartridge storage portion 20 which allows a disk cartridge 3 held by the holder 21 to go in and out through an opening portion at an end of the carrier frame 17.

As shown in FIGS. 6 and 7, in the rear portion of the carrier frame 17, the center portion of the disk cartridge storage portion 20 in the direction of its thickness is rotatably supported by a horizontal shaft 34. A multi-thread screw 35 is supported by shaft bearings 36 on one surface of the carrier frame 17 in the direction of the length thereof, whereas a guide bar 37 is fixed on the other surface of the carrier frame 17. A nut member 26 mounted on one surface of the holder 21 is thread-engaged with the multi-thread screw 35 whereas a guide cylinder 27 mounted on the other surface of the holder 21 is put idly on the guide bar 37.

The aforementioned carrying device 32 is formed so that a screw rotating gear 44 fixed to a shaft end of the multi-thread screw 35 is engaged with a drive gear 39 driven to rotate by a motor 38 arranged on the elevator 31, through intermediate gears 40, 41 and 42 and a first gear 43 rotatably provided on a supporting shaft 34 of the carrier frame 17.

Accordingly, because the multi-thread screw 35 rotates through the gear mechanism 40 to 44 when the drive gear 39 is driven to rotate, the nut member 26 thread-engaged with the multi-thread screw 35 goes straight in the direction of the axis of the multi-thread screw 35 so that the holder 21 can make a reciprocating motion in the front and rear of the holder 21, that is, in the direction of the X axis in FIG. 1.

Then, the aforementioned carrier inverting device 33 is formed so that a second gear 45 is fixed to the carrier frame 17, clutch gears 46 and 47 are engaged with the rotatable first gear 43 and the fixed second gear 45, respectively, and one of the clutch gears 46 is moved on a shaft 49 by a cam plate 51 operated by a solenoid 50 so as to allow opposite clutch portions of the clutch gears 46 and 47 to go into each other. Incidentally, in FIG. 3, the reference numeral 52 designates a driven cam plate engaged with the cam plate 51. The driven cam plate 52 is moved while the clutch gear 46 is pressed by the sliding of an inclined surface 53 on which they are engaged with each other. Further, a bearing portion 54 engaged laterally with stopper pins 28 projected from the carrier frame 17 is provided at the other end of the cam plate 51. The stopper pins 28 are provided so as to be laterally symmetrical with respect to the supporting shaft 34. Further, stoppers 56 which abut on stopper bearings 55 of the elevator 31 are provided on opposite sides of the carrier frame 17.

When the carrier frame 17 is to be inverted by 180°, the cam plate 51 is pulled by the solenoid 50. Then, the bearing portion 54 is disengaged from the stopper pins 28 so that the carrier frame 17 becomes free. At the same time, the driven cam plate 52 is pressed by sliding the cam plate 51 to thereby press the clutch gear 46 toward the clutch gear 47, so that the opposite clutch portions of the clutch gears 46 and 47 go in each other. Hence the clutch gears 46 and 47 are united with each other. Accordingly, the first gear 43 and the second gear 45 are made to go into a transmission state by the united clutch gears 46 and 47 engaged with these gears 43 and 45, so that when the drive gear 39 is then driven to rotate by the motor 38, the second gear 45 is rotated through the gear mechanism 40 to 43 and the clutch gear mechanism 46, 47 and 48. Because the second gear 45 is fixed to the carrier frame 17, the carrier frame 17 rotates around the supporting shaft 34 and the rotation of the carrier frame 17 is stopped when the other stopper 56 abuts on the stopper bearing 55.

In this manner, the carrier frame 17 can be rotated by 180° in reverse directions alternately as indicated by the arrows c and d in FIG. 6, so that the cartridge storage portion 20 can be rotated by 180° around the horizontal center axis 57 (which coincides with the center of the supporting shaft 34) at the height of the space thereof.

After the inversion of the carrier frame 17 is completed, the solenoid 50 is demagnetized to restore the cam plate 51 to its original position and the clutch portion between the gear 46 and the gear 47 is switched off to make the bearing portion 54 engage with the other stopper pin 28 to thereby fix the carrier frame 17.

In the following, the mechanism for opening/closing the claws of the holder 21 will be described.

As described above, the holder 21 is allowed to go in and out of the inside of the carrier frame 17 by the carrying device 32. This claw opening/closing mechanism is designed to open and close the claw arms 24 mechanically by using the going-in-and-out operation of the holder 21.

Figure 8:
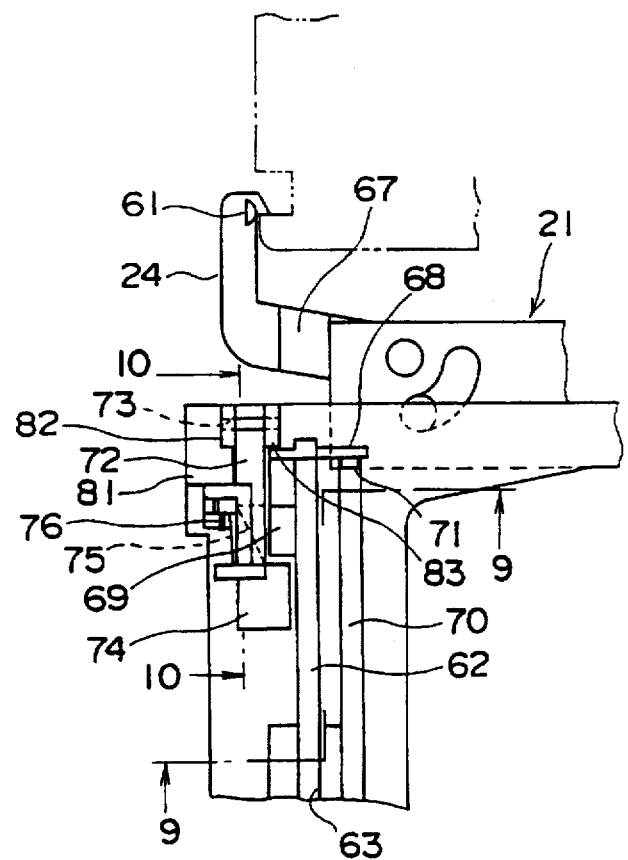
FIG. 8 is an enlarged plan view of portion C in FIG. 3.
Figure 9:
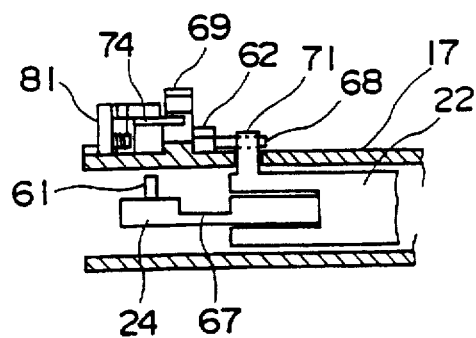
FIG. 9 is a sectional view taken along the line 9—9 in FIG. 8.
Figure 10:
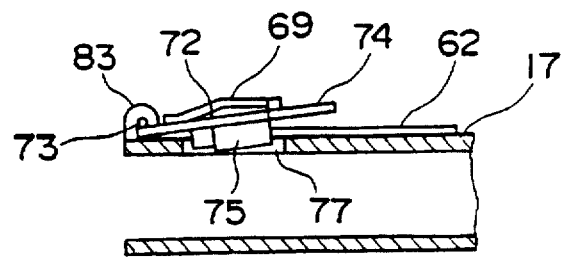
FIG. 10 is a sectional view taken along the line 10—10 in FIG. 8.

FIG. 8 is an enlarged plan view of the portion C in FIG. 3, FIG. 9 is a sectional view taken along the line 9—9 in FIG. 8, and FIG. 10 is a sectional view taken along the line 10—10 in FIG. 8.

A projection 61 D-shaped in section is provided on an end portion of each of the claw arms 24 so as to be perpendicular thereto. A slide mechanism 60 for opening/closing the claws is provided on one side (the left side in FIG. 3) of the upper surface portion of the carrier frame 17. On the right side in FIG. 3, such a slide mechanism 60 is provided downward in the lower surface portion of the carrier frame 17, so that a projection 61 corresponding to the right claw arm 24 is directed downward. That is, left and right projections 61 are oppositely directed upward and downward, respectively. In this manner, a pair of claw opening/closing mechanisms are arranged on the upper and lower surfaces of the carrier frame 17 on the diagonal hereof.

Because the upper and lower slide mechanisms have the same structure, only the left slide mechanism 60 will be described below. A long slide plate 62 is provided so as to slide within a guide groove 63 of the carrier frame 17. The reference numeral 64 designates a pressure plate for pressing the slide plate 62. The rear portion of the slide plate 62 is curved perpendicularly to form an L-shaped curved piece. A projection 65 constituted by this L-shaped curved piece projects into the inside of the carrier frame 17 through a long hole 66 communicated with the guide groove 63 so as to abut on the rear end surface 3a of the disk cartridge 3. Incidentally, the claw arm 24 is provided with a groove 67 through which the projection 65 can pass without any interference of the claw arm 24 with the projection 65.

A restoration projection 68 and a cam operation piece 69 are provided on opposite sides of an end portion of the slide plate 62. The restoration projection 68 moves on a long hole 70 which is provided in the inside of the guide groove 63 of the slide plate 62 so as to be parallel therewith. A projection 71 provided on the holder base 22 so as to be erected therefrom projects out through the long hole 70. When the holder 21 moves forward, the projection 71 presses the restoration projection 68 to restore the slide plate 62 to its original position.

A claw opening cam plate 72 is provided on a side of the cam operation piece 69 of the slide plate 62. The cam plate 72 has a transverse shaft 73 provided in its front end portion, a plate portion 74 provided in its rear portion, and a triangular guide cam 75 provided in the lower surface of its intermediate portion so as to be erected therefrom. The opposite end portions of the transverse shaft 73 are supported by a shaft bearing 82 of a mount plate 81 and a shaft bearing 83 of the carrier frame 17, respectively. A torsion spring 76 provided between the mount plate 81 and the cam plate 72 always urges the cam plate 72 to move upward around the transverse shaft 73.

The guide cam 75 is designed so that when the slide plate 62 slides to make the cam operation piece 69 press the plate portion 74 of the cam plate 72, the guide cam 75 projects out into the carrier frame 17 through a long hole 77 provided in the carrier frame 17. When the holder 21 moves forward, the projection 61 provided on the claw arm 24 is guided along the inclined surface of the triangular guide cam 75 so that the claw arm 24 is rotated in the direction b in FIG. 3 so as to be opened. As a result, the claw 23 is disengaged from the notch groove 19 of the disk cartridge 3, so that the disk cartridge 3 is departed from the holder 21.

Figure 11:
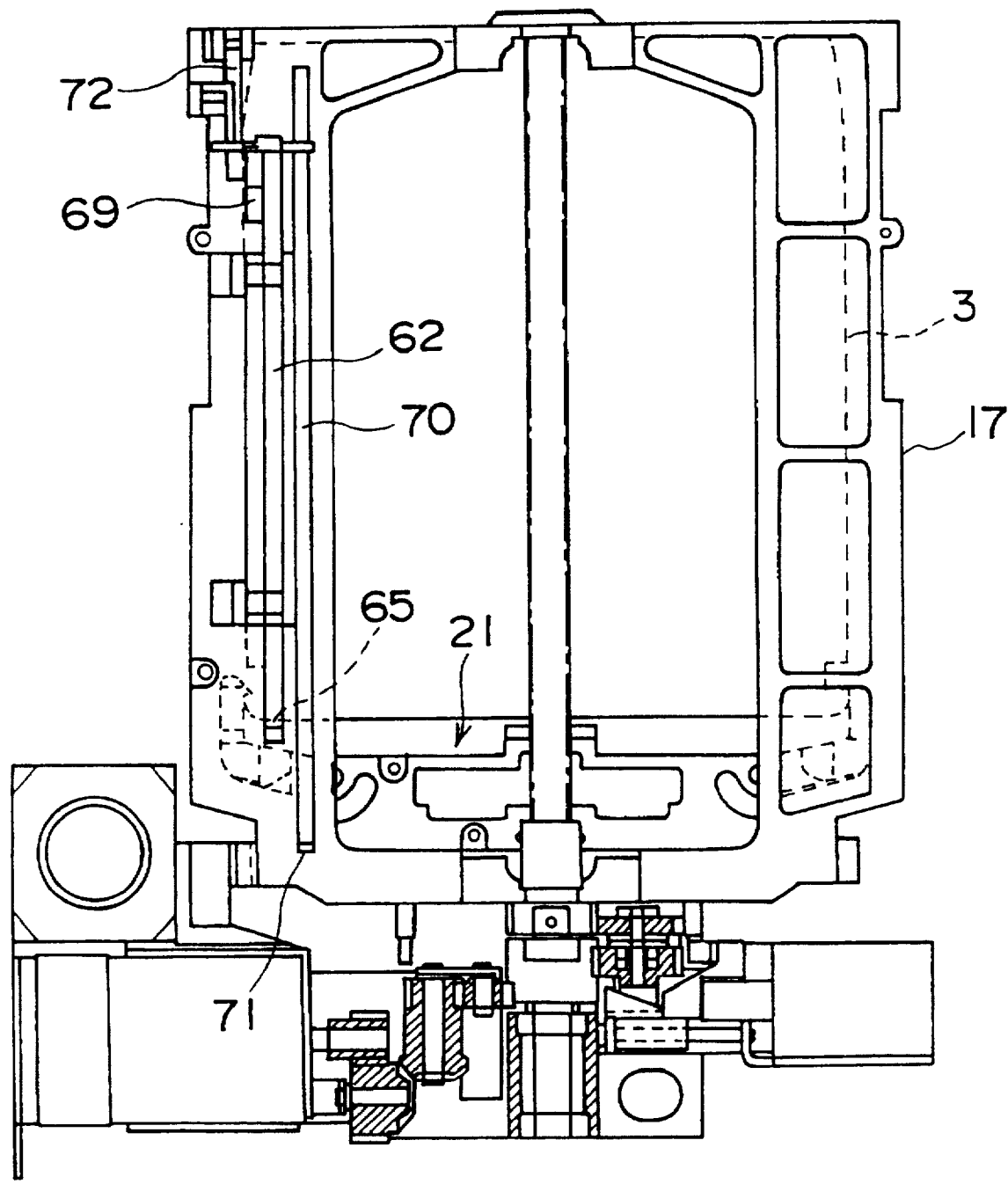
FIG. 11 is a plan view showing a state in which a disk cartridge is stored in the inside of a carrier frame.
Figure 12:
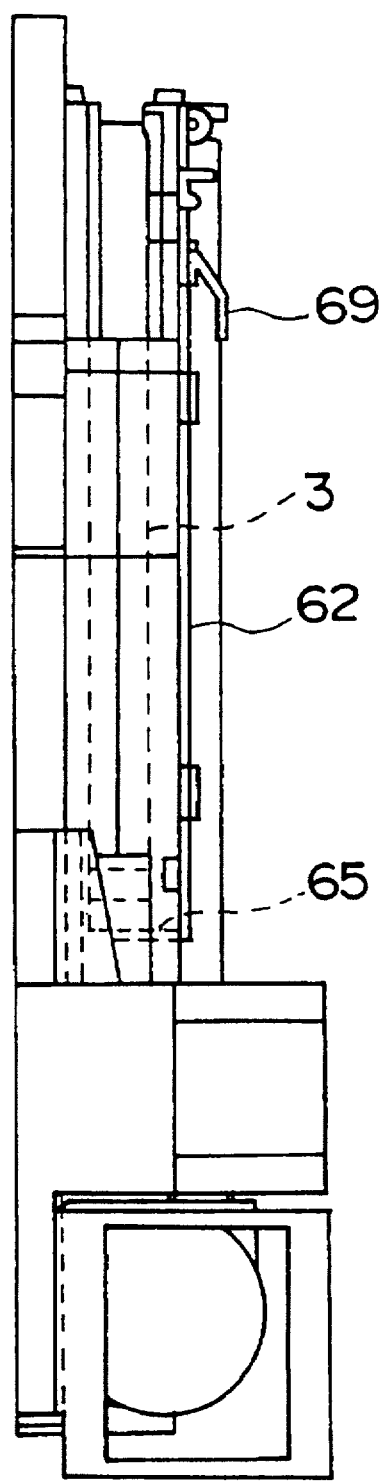
FIG. 12 is a side view of FIG. 11.
Figure 13:
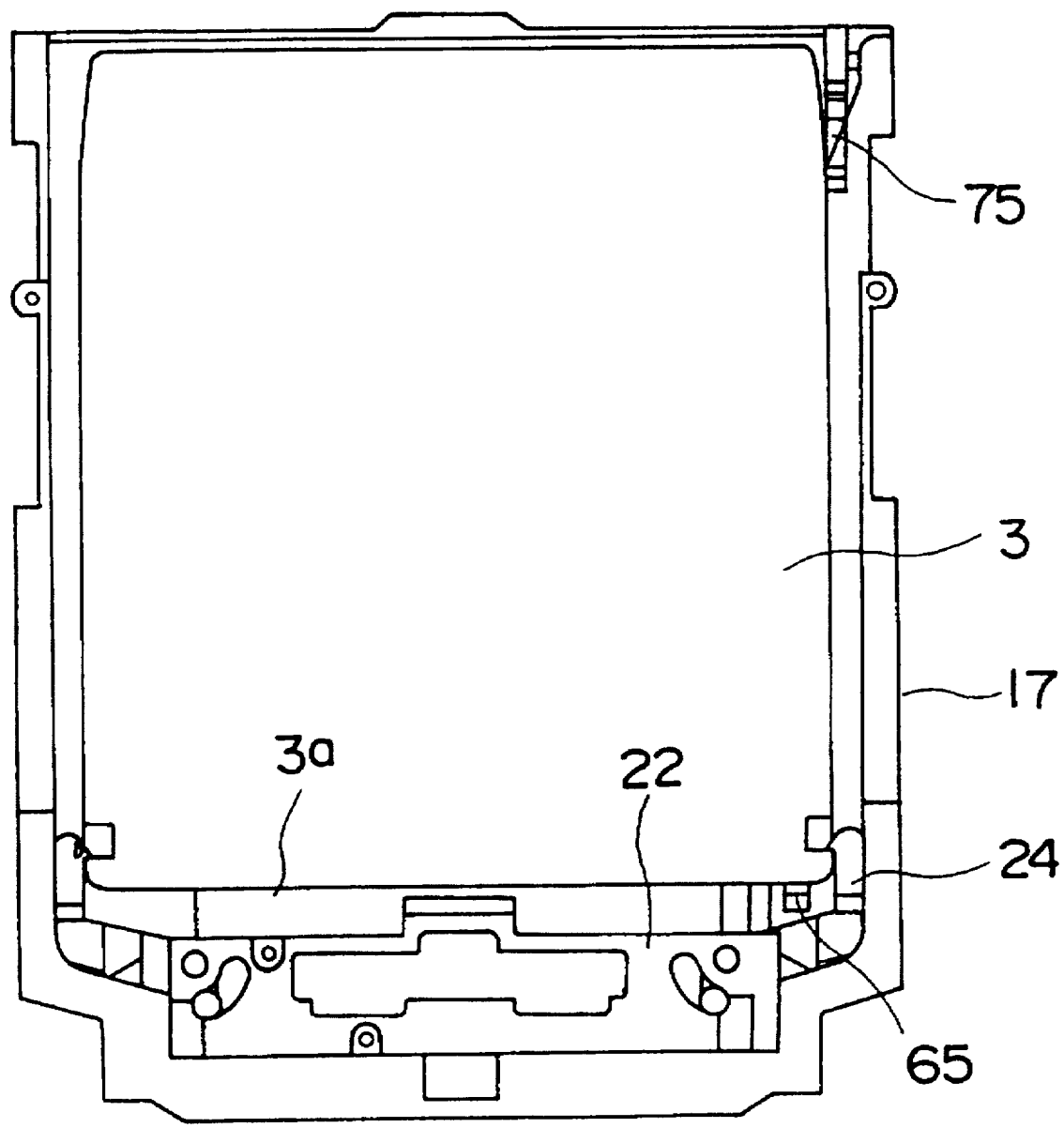
FIG. 13 is a rear view from the inside of a carrier frame.
Figure 14:
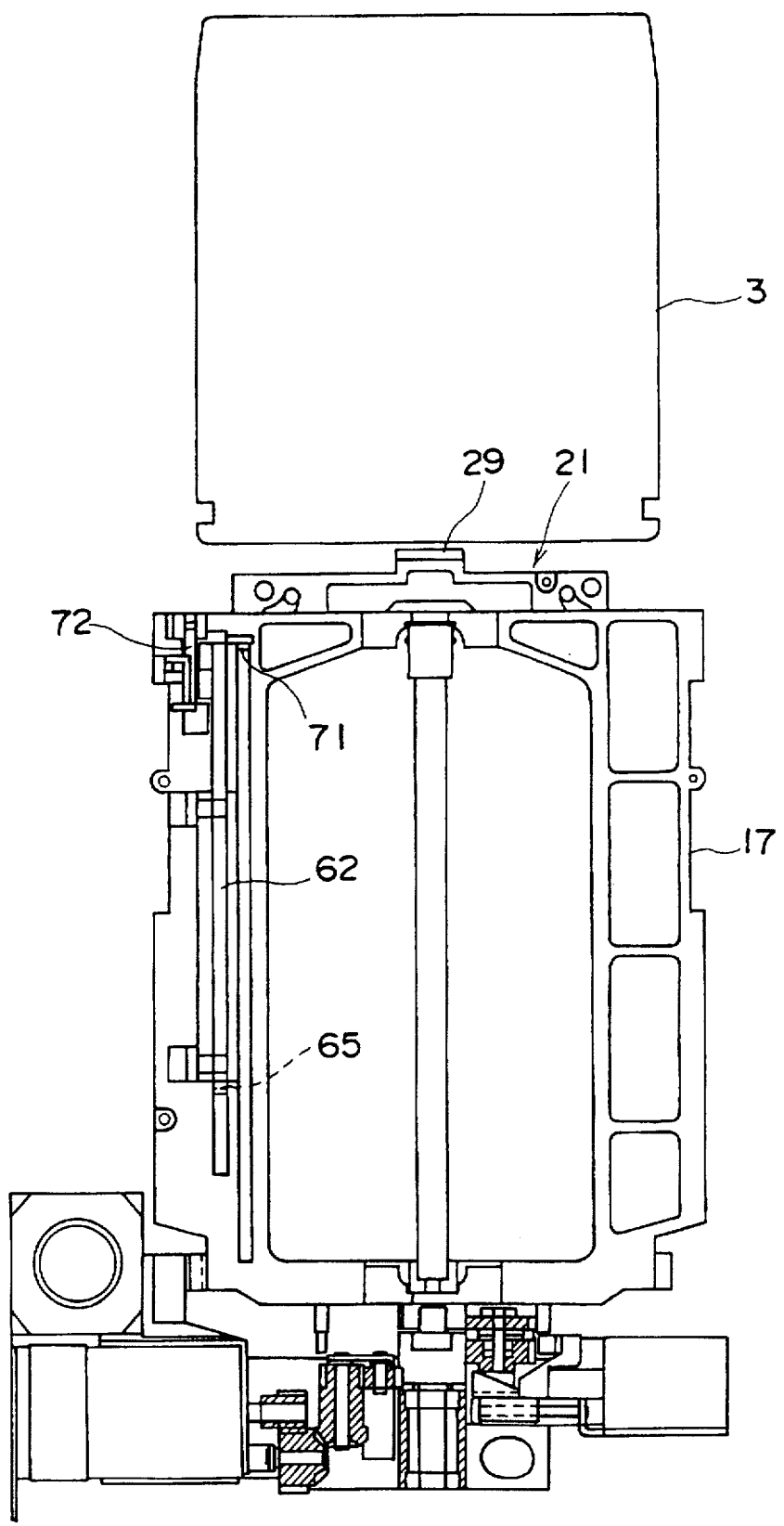
FIG. 14 is a plan view showing a state in which a disk cartridge is released.
Figure 15:
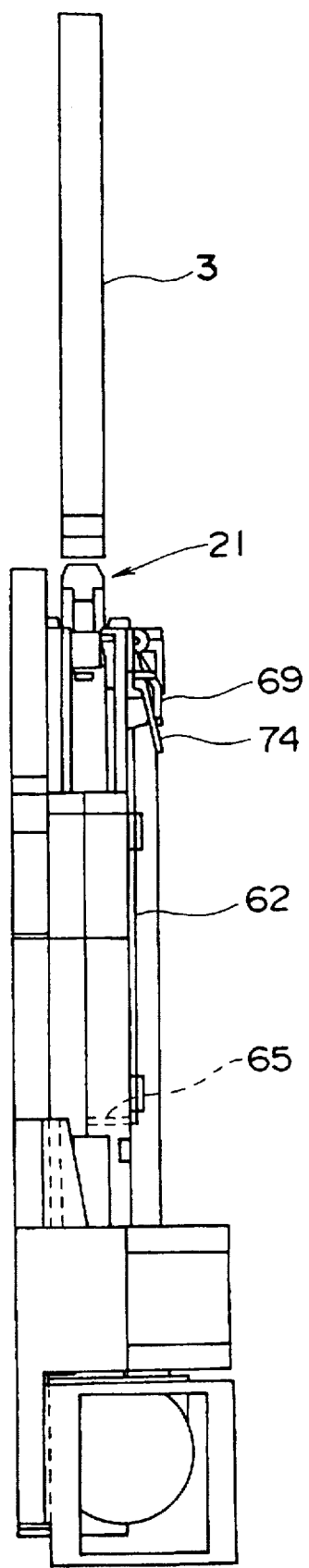
FIG. 15 is a side view of FIG. 14.
Figure 16:
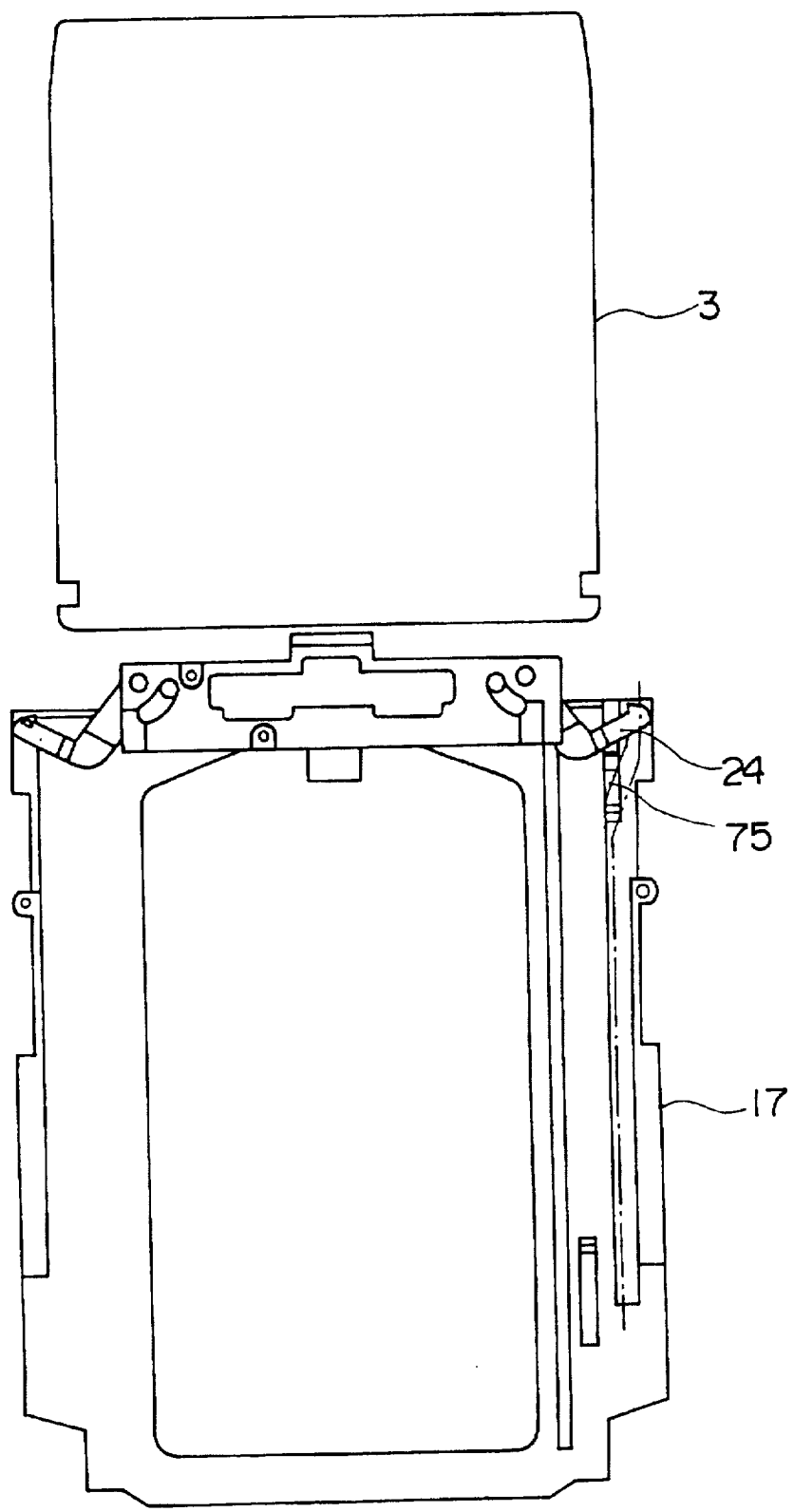
FIG. 16 is a rear view from the inside of a carrier frame.

The operation of the aforementioned claw opening/closing mechanism will be described further with reference to FIGS. 11 through 16. FIG. 11 is a plan view showing a state in which a disk cartridge 3 is stored in the carrier frame 17 by the holder 21. FIG. 12 is a side view of FIG. 11. FIG. 13 is a rear view from the inside of the carrier frame. FIG. 14 is a plan view showing a state in which the disk cartridge 3 is departed from the holder 21. FIG. 15 is a side view of FIG. 14, and FIG. 16 is a rear view from the inside of the carrier frame.

First, as shown in FIG. 1, a disk cartridge 3 inserted into the casing 2 of this apparatus through the entrance and exit 9 thereof is taken out by the carrier device 6 of the automatic disk exchanging device 7 which is stopped by the carrying device 12 at a position opposite to the disk cartridge 3. That is, when the holder 21 of the carrier device 6 at that position is moved forward horizontally by the carrying device 32, the claw arms 24 move so as to be opened along side surfaces of the disk cartridge 3 from a curved portion 3b at an end portion of the disk cartridge 3 so that the claws 23 are finally engaged with the notch grooves 19 by spring force. This state is shown in FIGS. 3 to 5.

Accordingly, when the holder 21 is then retreated, the disk cartridge 3 can be drawn out of the holding position P at the upper portion of the storage device 4. The disk cartridge 3 is stored by the holder 21 in the storage portion 20 inside the carrier frame 17. This storage state is shown in FIGS. 11 to 13.

Further, in the operation of retreating the holder 21, first, the slide projection 65 of the slide plate 62 is pressed by the end surface 3a of the held disk cartridge 3 to make the slide plate 62 slide in the direction of the retreating of the holder 21. As a result, the cam operation piece 69 of the slide plate 62 presses the plate portion 74 of the cam plate 72, so that the triangular guide cam 75 projects out into the disk cartridge storage portion 20. By the projection of the cam 75, a preparation for opening the claw arm 24 is completed.

Then, after the carrier device 6 is carried down to a predetermined position of the storage device 4 so as to be stopped thereat, the holder 21 is moved forward. In this occasion, the claw arm 24 is opened to disengage the claw 23 from the notch groove 19 because the projection 61 provided on the claw arm 24 is guided along the inclined surface of the guide cam 75. Accordingly, the disk cartridge 3 is departed from the holder 21 and inserted into the storage device 4 so as to be stored therein. This state is shown in FIGS. 14 to 16. Incidentally, at the time of insertion of the disk cartridge 3, the disk cartridge 3 is pressed by the projection portion 29 provided at the center portion of the holder base 22 so that the disk cartridge 3 is inserted therein.

In this manner, not only disk cartridges 3 can be stored in the storage device 4 successively automatically but the disk cartridges 3 can be picked out selectively from the storage device 4.

Further, when the holder 21 is moved forward, the slide plate 62 is restored to its original position because the projection 71 of the holder base 22 abuts on the restoration projection 68 and presses the projection 68 whereas the cam plate 72 is restored to its original position because the operation of pressing the cam plate 72 is canceled. Further, the claw arm 24 is restored to the state of FIG. 3 (except that the disk cartridge is not held).

Figure 17:
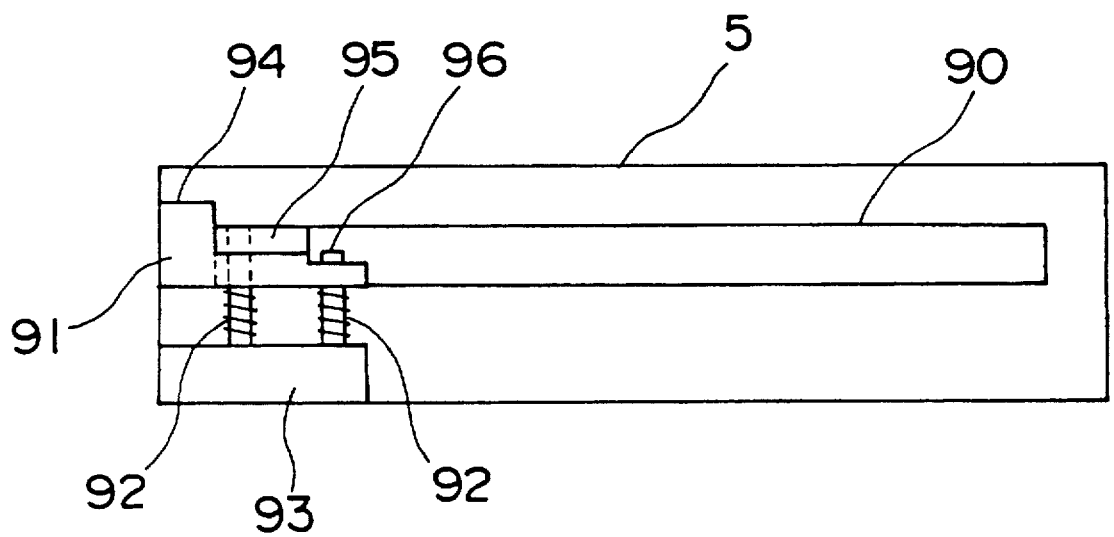
FIG. 17 is a front view of a stopper device.
Figure 18:
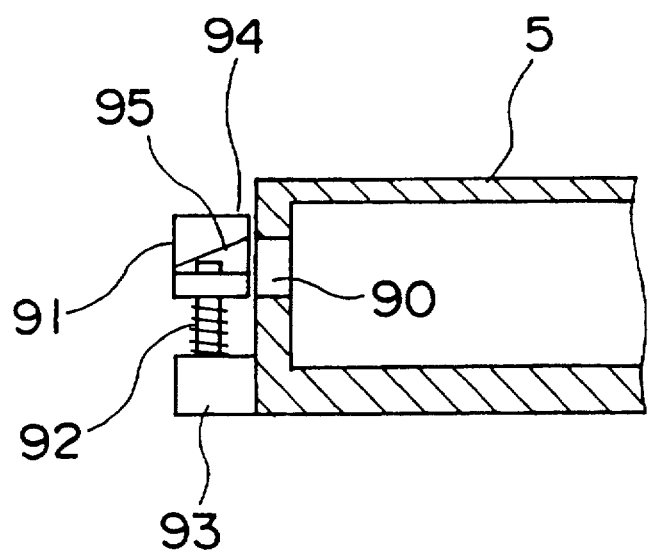
FIG. 18 is a side view of FIG. 17.

Then, a stopper device 11 as shown in FIG. 17 is provided in the insertion hole 90 of the drive device 5. FIG. 17 is a front view of the drive device 5 having the stopper device 11, and FIG. 18 is a side view of the same.

The stopper device 11 is designed so that an unloaded disk cartridge is prevented from ejecting unless the operation of taking out the disk cartridge is completed. Although a conventional stopper device is formed so that a stopper is released by using a solenoid or the like, the stopper device according to the present invention is formed so that the stopper is released by the descending operation of the carrier carrying device 12. That is, as shown in FIGS. 17 and 18, a substantially L-shaped stopper 91 is mounted on a mount 93 so as to be urged to move upward by springs 92. The stopper 91 has a projection portion 94 at an outer end portion, and a guide portion 95 provided with an inclined surface for guiding the insertion of the disk cartridge 3. Further, the stopper 91 is guided vertically by a plurality of guide pins 96 which are provided on the mount 93 so as to be erected therefrom. The springs 92 are mounted on these guide pins 96.

In this stopper device 11, the stopper 91 is generally in a state in which the stopper 91 is moved up by the springs 92, so that an end portion of the insertion hole 90 of the drive device 5 is blocked. Accordingly, the disk cartridge 3 inserted into the drive device 5 cannot be ejected. Accordingly, there is no risk of interference of the disk cartridge with the holder, carrier frame, etc. on the way of carrying caused by the ejection of the disk cartridge in the case where such a stopper device is not provided.

Next, as for this stopper device 11, when the holder 21 is moved forward at a position opposite to the insertion hole 90 in the case where a disk cartridge is to be inserted into the drive device 5, an end portion of the disk cartridge 3 held by the holder 21 is guided by the inclined surface of the guide portion 95 of the stopper 91 so that the disk cartridge 3 is inserted into the drive device 5 while the stopper 91 is pressed down. The operation of opening the claws in this occasion is as described above. Further, in the case where information is to be recorded on the opposite surface of the disk or in the case where information recorded on the opposite surface of the disk is to be reproduced, the carrier frame 17 is inverted by 180° together with the disk cartridge 3 by the aforementioned carrier inverting device 33 before the disk cartridge 3 is inserted into the drive device 5.

In the case where the disk cartridge is to be ejected from the drive device 5, first, the claw arms 24 of the holder 21 are made to project out of the carrier frame 17 in a state in which the carrier device 6 is once stopped at a position Q (see FIG. 1) slightly above the stopper 91 by the carrier carrying device 12. When the carrier device 6 in this state is then moved down to a position R, the stopper 91 is released because the claw arms 24 press the projection portion 94 of the stopper 91 to thereby press down the stopper 91.

Accordingly, when the unloaded disk cartridge 3 is ejected from the drive device 5, the disk cartridge 3 can be held by the claw arms 24 as described above. Thereafter, while the disk cartridge 3 is stored in the inside of the carrier frame 17, the disk cartridge 3 is carried by the carrying device 12 so as to be restored to its original position of the storage device 4 or ejected to the outside in the same manner as described above.

Then, the aforementioned filter device 10 is mounted to a suitable position of the casing 2. There are generally two kinds of filters, that is, general filters and electrostatic filters. These filters are different in thickness. Because such two kinds of filters different in thickness may be mounted so as to overlap each other, respective filter holders corresponding to these filters must be prepared in the conventional case.

On the contrary, the present invention is configured so that two kinds of filters can be mounted by one filter holder individually or simultaneously.

Figure 19:
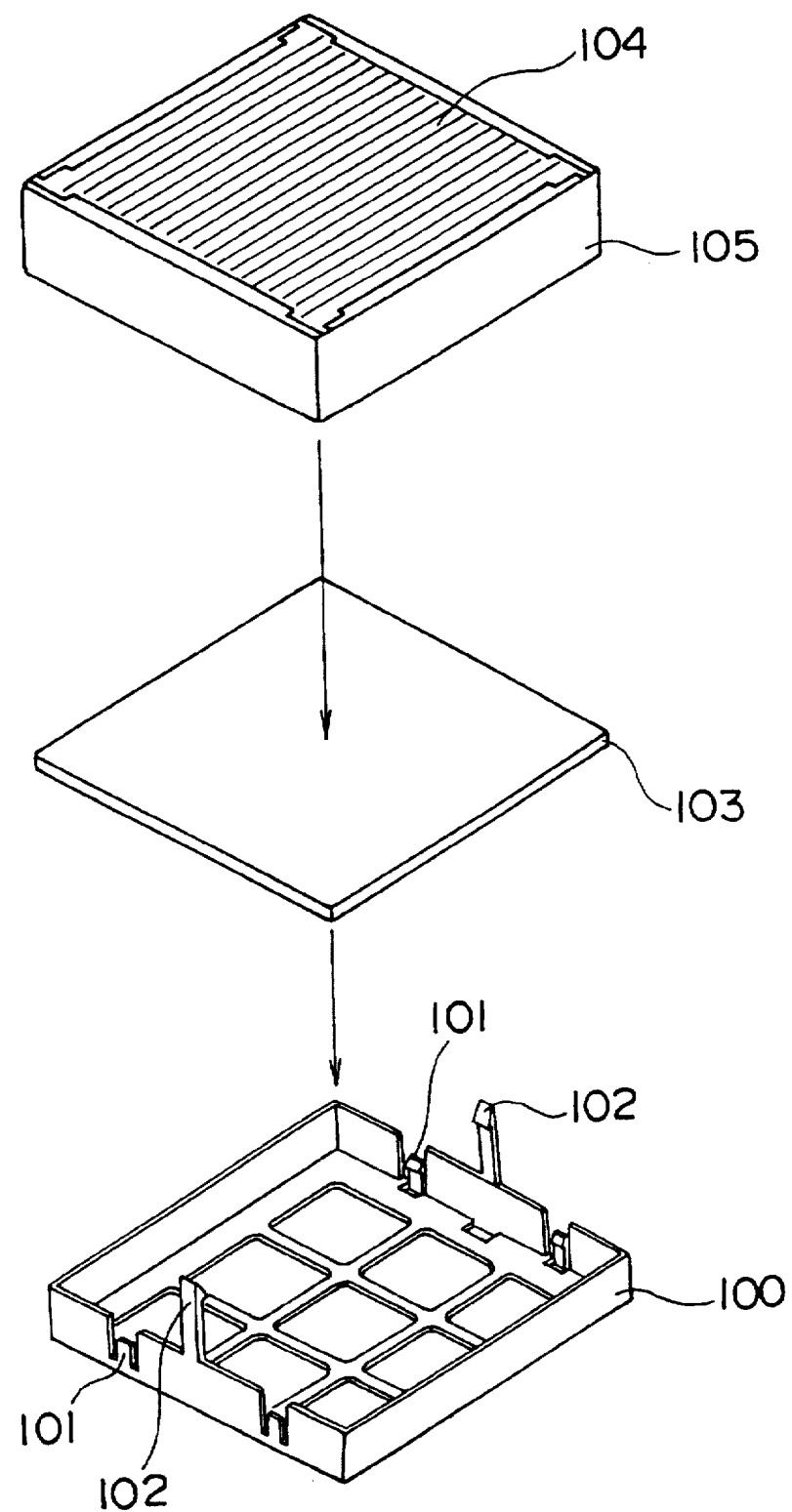
FIG. 19 is a perspective view of a filter device.

FIG. 19 is a perspective view of the filter holder according to the present invention. In the drawing, the reference numeral 100 designates a box-type filter holder, 101 low claws provided on opposite sides of the filter holder in order to fix a general filter 103 and 102 high claws provided on opposite sides of the filter holder in order to fix an electrostatic filter 104. Further, the electrostatic filter 104 is put into a rectangular frame 105.

The filter holder 100 is a molding of synthetic resin and the claws 101 and 102 have elasticity as to nature, so that it is easy to mount and demount the filters 103 and 104.

According to the aforementioned configuration, the thinner general filter 103 is fixed between the low claws 101 and the lattice-like bottom surface of the filter holder 100. Further, the claws 102 are engaged with the upper surface of the frame 105, so that the thicker electrostatic filter 104 is fixed between the claws 101 and the claws 102 by this engagement.

We claim:

1. A disk file apparatus comprising a storage device in which disk cartridges each containing a disk therein are stored multistageously so that each of said disk cartridges is kept horizontal, a drive device for recording information onto a selected one of the disks and reproducing information recorded on a selected one of the disks and an automatic disk exchanging device for picking a selected one of said disk cartridges out of said storage device so as to carry the selected disk cartridge vertically to thereby supply the selected disk cartridge to said drive device and for picking a disk cartridge out of said drive device so as to carry the disk cartridge vertically to thereby store the disk cartridge in said storage device, characterized in that said automatic disk exchanging device includes:

a carrier device including both an elevator connected to a vertically carrying means and a carrier frame supported on said elevator so as to be rotatable by 180° in reverse directions alternatively;

a holder allowed to go in and out of the inside of said carrier device and having a pair of claw arms for holding said disk cartridge;

a carrying device arranged on said elevator for carrying said holder backward and forward;

a claw opening/closing mechanism provided in said carrier device, for opening/closing said pair of claw arms by mechanical engagement and interlocking with the going-in-and-out operation of said holder, a carrier inverting device arranged on said elevator for alternatively rotating said carrier frame by 180° around a horizontal center axis which passes through the thickness center of a disk cartridge storage portion inside said carrier device; wherein said carrier frame is supported on said elevator through a horizontal supporting shaft in the form of a cantilever so as to be rotatable on the shaft, and that said holder and said claw opening/closing mechanism are mounted on said carrier frame, and said claw opening/closing mechanism is constituted by a slide mechanism provided on said carrier frame, said slide mechanism including:

a slide plate having a slide projection abutting on said disk cartridge at an end surface thereof in the direction of drawing-out of said disk cartridge, and a restoration projection abutting on a projection provided on said holder; and a cam plate which is pressed by sliding of said slide plate to thereby make a guide cam project into said carrier frame so as engage with claw opening projections provided on said claw arms.

2. A disk file apparatus according to claim 1, characterized in that a pair of said claw opening/closing mechanisms are arranged on upper and lower surfaces of said carrier frame on its diagonal.

3. A disk file apparatus comprising a storage device in which disk cartridges each containing a disk therein are stored multistageously so that each of said disk cartridges is kept horizontal, a drive device for recording information onto a selected one of the disks and reproducing information recorded on a selected one of the disks, and an automatic disk exchanging device for picking a selected one of said disk cartridges out of said storage device so as to carry the selected disk cartridge vertically to thereby supply the selected disk cartridge to said drive device and for picking a disk cartridge out of said drive device so as to carry the disk cartridge vertically to thereby store the disk cartridge in said storage device, characterized in that said automatic disk exchanging device includes:

a carrier device including both an elevator connected to a vertically carrying means and a carrier frame supported on said elevator so as to be rotatable by 180degrees in reverse directions alternatively;

a holder allowed to go in and out of the inside of said carrier device and having a pair of claw arms for holding said disk cartridge;

a carrying device arranged on said elevator for carrying said holder backward and forward;

a claw opening/closing mechanism provided in said carrier device, for opening/closing said pair of claw arms by mecanical engagement and interlocking with the going-in-and-out operations of said holder; and a carrier inverting device arranged on said elevator and connected to said carrying device through a clutch mechanism for alternatively rotating said carrier frame by 180 degrees around a horizontal center axis which passes through the thickwise center of a disk cartridge storage portion inside said carrier device; and wherein said carrying device comprises:

a motor;

gears to transmit rotation of said motor;

a first gear provided on said horizontal supporting shaft so as to be rotatable; and a gear mechanism engaged with said first gear, through which said holder is allowed to go in and out, and said inverting device comprises:

a second gear provided on said horizontal supporting shaft and fixed to said carrier frame; and clutch gears engaged with said first and second gears, respectively, and provided with a clutch interposed between said clutch gears, through which said clutch gears rotate said carrier frame by 180°; and a driving means for switching said clutch.

4. A disk file apparatus according to claim 3, characterized in that said driving means for switching said clutch on and off is a solenoid.

* * * * *